United States Patent
Zhang

(10) Patent No.: US 11,589,030 B2
(45) Date of Patent: Feb. 21, 2023

(54) METHOD AND DEVICE FOR CONVERTING 2D IMAGE INTO 3D IMAGE AND 3D IMAGING SYSTEM

(71) Applicant: Scivita Medical Technology Co., Ltd., Jiangsu (CN)

(72) Inventor: Yi Zhang, Jiangsu (CN)

(73) Assignee: Scivita Medical Technology Co., Ltd., Jiangsu (CN)

( * ) Notice: Subject to any disclaimer, the term of this patent is extended or adjusted under 35 U.S.C. 154(b) by 249 days.

(21) Appl. No.: 17/055,257

(22) PCT Filed: May 6, 2019

(86) PCT No.: PCT/CN2019/085688
§ 371 (c)(1),
(2) Date: Nov. 13, 2020

(87) PCT Pub. No.: WO2019/218887
PCT Pub. Date: Nov. 21, 2019

(65) Prior Publication Data
US 2021/0127107 A1    Apr. 29, 2021

(30) Foreign Application Priority Data

May 14, 2018   (CN) .......................... 201810456740.4

(51) Int. Cl.
*H04N 13/261*    (2018.01)
*H04N 13/128*    (2018.01)
(Continued)

(52) U.S. Cl.
CPC ......... *H04N 13/261* (2018.05); *G06T 3/0068* (2013.01); *G06T 3/20* (2013.01);
(Continued)

(58) Field of Classification Search
None
See application file for complete search history.

(56) References Cited

U.S. PATENT DOCUMENTS

2007/0104394 A1*  5/2007  Chou .................... G06T 3/4007
                                                              382/300
2012/0140027 A1*  6/2012  Curtis .................. H04N 13/261
                                                              348/43

FOREIGN PATENT DOCUMENTS

CN    103329547 A    9/2013
CN    108712643 A    10/2018
(Continued)

*Primary Examiner* — Xiaolan Xu
(74) *Attorney, Agent, or Firm* — Peter W. Schroen; Bret E. Field; Bozicevic, Field & Francis LLP

(57) ABSTRACT

The present disclosure discloses a method and a device for converting two-dimensional (2D) images into three-dimensional (3D) images and a 3D imaging system, wherein the method comprises the following steps: acquiring 2D image to be processed; performing perspective transformation on the 2D image to obtain a left-eye image and a right-eye image respectively; adjusting a distance between the left-eye image and the right-eye image according to the result of perspective transformation; and synthesizing the left-eye image and the right-eye image after the distance adjustment. In embodiments of the present disclosure, binocular parallax images are created by performing perspective transformation on the 2D image to be processed; the distance between the left-eye image and the right-eye image after perspective transformation is adjusted to form binocular parallax and create a convergence angle, so that the images observed by naked eyes are located at different depths, thus different stereoscopic effects may be seen. The image transformation is performed on the 2D image without involving the resolution and definition of the image, so that the image quality (Continued)

of the 3D imaged image is the same as that of the original 2D image and the 3D imaging effect is not affected.

8 Claims, 4 Drawing Sheets

(51) Int. Cl.
    *H04N 13/156*     (2018.01)
    *G06T 3/00*     (2006.01)
    *G06T 3/20*     (2006.01)
    *G06T 3/40*     (2006.01)
(52) U.S. Cl.
    CPC ............. *G06T 3/40* (2013.01); *H04N 13/128* (2018.05); *H04N 13/156* (2018.05)

(56) References Cited

FOREIGN PATENT DOCUMENTS

| | | |
|---|---|---|
| CN | 108737810 A | 11/2018 |
| WO | WO9715150 A1 | 4/1997 |

* cited by examiner

METHOD AND DEVICE FOR CONVERTING 2D IMAGE INTO 3D IMAGE AND 3D IMAGING SYSTEM

FIELD OF THE PRESENT DISCLOSURE

The present disclosure relates to a field of image processing technology, in particular to a method and a device for converting a two-dimensional (2D) image into a three-dimensional (3D) image and a 3D imaging system.

BACKGROUND OF THE PRESENT DISCLOSURE

Stereoscopic vision means when an object is viewed through both eyes by human, a sense, of the thickness of the viewed objects and the depth or distance of space and the like, may arise subjectively. The main reason is that the images of the same viewed object on the retinas of both eyes are not exactly identical, where the left eye sees more left side of the object from the left while the right eye sees more right side of the object from the right; and a stereoscopic image of the object is generated after the image information from both eyes is processed through a senior visual center.

With the development of display technology and digital technology, it has become a research hotspot to imitate the stereoscopic vision of human eyes by the use of electronic products. In the prior art, users may view a 3D image only if a 3D camera device is adopted. Most of the existing 3D camera devices operate by imitating the structure of human eyes, each of which comprises two cameras, wherein an image acquired by one of the cameras corresponds to a left-eye image for human eyes, and an image acquired by the other of the cameras corresponds to a right-eye image for human eyes; and then, the left-eye image and the right-eye image may be synthesized by image processing means to form the 3D image.

In the prior art, when the 3D camera device is utilized to acquire the image, two polarizers with polarization directions perpendicular to each other are generally arranged in front of a lens of each of the cameras to obtain images for the left eye and the right eye. Since each camera acquires the image only in one polarization direction, it results in that the resolution and definition of the whole image will be half of the actual image, thereby affecting the 3D imaging effect.

SUMMARY OF THE PRESENT DISCLOSURE

In view of this, embodiments of the present disclosure provide a method and a device for converting 2D image into 3D image and image processing means to solve the problem of poor 3D imaging effect.

In a first aspect, an embodiment of the present disclosure provides a method for converting 2D image into 3D image, wherein the method comprises the following steps:
acquiring 2D image to be processed;
performing perspective transformation on the 2D image to be processed to obtain a left-eye image and a right-eye image, respectively, wherein the perspective transformation refers to mapping the 2D image to be processed according to a preset rule;
adjusting a distance between the left-eye image and the right-eye image according to a result of the perspective transformation; and
synthesizing the left-eye image and the right-eye image after the distance adjustment.

According to the embodiment of the present disclosure, binocular parallax images are created by performing perspective transformation on the 2D image to be processed to realize stereoscopic vision; the distance between the left-eye image and the right-eye image after perspective transformation is adjusted to form binocular parallax and create a convergence angle, so that the images observed by naked eyes are located at different depths, thus different stereoscopic effects may be seen. That is, the image transformation is performed on the 2D image without involving the resolution and definition of the image, so that the image quality of the 3D imaged image is the same as that of the original 2D image and the 3D imaging effect is not affected.

In combination with the first aspect, the step of performing perspective transformation on the 2D image to be processed in a first implementation mode of the first aspect comprises:
aligning the 2D image to be processed onto an image template, and extracting sizes of the 2D image to be processed;
sequentially performing linear scaling on the sizes of respective sides according to the preset rule to obtain a first image;
mirroring the first image to obtain a second image, wherein the first image is as the left-eye image and the second image is as the right-eye image; or, the first image is as the right-eye image and the second image is as the left-eye image.

According to the embodiment of the present disclosure, the 2D image is converted into two images corresponding to the left eye and the right eye by linear scaling, that is, the 2D image without parallax is converted into the left-eye image and the right-eye image with parallax; and the conversion process involves only the image sizes and is irrelevant to the image quality, so the left-eye image and the right-eye image formed by linear scaling have the same quality as the original 2D image. The left-eye image and the right-eye image may be formed through the conversion method provided by the present embodiment of the present disclosure while ensuring unchanged image quality.

In combination with the first implementation mode of the first aspect, the process of sequentially performing linear scaling on the sizes of the respective sides in sequence according to the preset rule in a second implementation mode of the first aspect comprises:
scanning the 2D image to be processed line by line; and
sequentially performing the linear scaling on respective lines of the image.

According to the embodiment of the present disclosure, the 2D image to be processed are scanned line by line, i.e., the linear scaling is performed sequentially on each line to reduce the amount of processed data, so that the real-time conversion of the 2D image may be realized.

In combination with the first implementation of the first aspect, the process of adjusting the distance between the left-eye image and the right-eye image according to the result of the perspective transformation in a third implementation mode of the first aspect comprises:
aligning the left-eye image and the right-eye image onto the image template at the same time; and
translating the left-eye image or the right-eye image in a first direction so that the distance between the left-eye image and the right-eye image reaches a preset distance.

According to the embodiment of the present disclosure, the left-eye image and the right-eye image are formed by using the same image template; and the left-eye image and the right-eye image are translated to create the binocular parallax and the convergence angle, so that the conversion efficiency is improved.

In combination with the first aspect, the 2D image to be processed is a frame image in a video stream in a fourth implementation mode of the first aspect.

The method for converting 2D image into 3D image provided by the embodiment of the present disclosure may convert a frame image in the video stream and a single 2D image, and has a wide application value.

In a second aspect, an embodiment of the present disclosure provides a device for converting 2D image into 3D image, comprising:

an acquisition module for acquiring the 2D image to be processed;

a perspective transformation module for performing perspective transformation on the 2D image to be processed to obtain a left-eye image and a right-eye image, respectively, wherein the perspective transformation refers to mapping the 2D image to be processed according to a preset rule;

an adjustment module for adjusting the distance between the left-eye image and the right-eye image according to a result of the perspective transformation; and a synthesis module for synthesizing the left-eye image and the right-eye image after the distance adjustment.

According to the embodiment of the present disclosure, binocular parallax images are created to realize stereoscopic vision by performing perspective transformation on the 2D image to be processed; the distance between the left-eye image and the right-eye image after perspective transformation is adjusted to form binocular parallax and create a convergence angle, so that the images observed by naked eyes are located at different depths, thus different stereoscopic effects may be seen. That is, the image transformation is performed on the 2D image without involving the resolution and definition of the image, so that the image quality of the 3D imaged image is the same as that of the original 2D image and the 3D imaging effect is not affected.

In combination with the second aspect, the perspective transformation module in a first implementation mode of the second aspect comprises:

an extraction unit for aligning the 2D image to be processed onto an image template and extracting sizes of the 2D image to be processed;

a linear scaling unit for sequentially performing linear scaling on the sizes of respective sides according to the preset rule to obtain a first image; and a mirroring unit for mirroring the first image to obtain a second image, wherein the first image is as the left-eye image and the second image is as the right-eye image; or, the first image is as the right-eye image and the second image is as the left-eye image.

In a third aspect, an embodiment of the present disclosure provides image processing means, comprising:

a memory and a processor, which are in communication connection with each other, wherein computer instructions are stored in the memory; and the processor implements the method for converting 2D image into 3D image in the first aspect or any implementation mode of the first aspect by executing the computer instructions.

In a fourth aspect, an embodiment of the present disclosure provides a computer-readable storage medium, wherein the computer-readable storage medium stores computer instructions for enabling a computer to implement the method for converting 2D image into 3D image in the first aspect or any implementation mode of the first aspect.

In a fifth aspect, an embodiment of the present disclosure provides a 3D imaging system, comprising:

image acquisition means, having a single lens as a lens for image acquisition;

the image processing means in the third aspect of the present disclosure, which is electrically connected to the image acquisition means, for converting the 2D image into the 3D image; and image display means, which is electrically connected to the image processing means for displaying the 3D image.

In the 3D imaging system provided by the embodiment of the present disclosure, the lens of the image acquisition means includes a single lens, so that the volume of the whole image acquisition means is reduced; in addition, the image acquisition means with the single lens needs only one data line to transmit the acquired image, which may reduce the inner diameter of a connection line between the image acquisition means and the image processing means, so that the 3D imaging system may be applied to small human organs to perform 3D imaging on human organs, thereby further improving the application scope of the 3D imaging system.

BRIEF DESCRIPTION OF THE DRAWINGS

The features and advantages of the present disclosure will be understood more clearly with reference to the accompanying drawings. The accompanying drawings are exemplary and should not be construed as limiting the present disclosure, wherein.

DESCRIPTION OF THE EMBODIMENTS

To make the purposes, technical solutions and advantages of the embodiments of the present disclosure clearer, the technical solutions of the embodiments of the present disclosure will be described clearly and completely with reference to the accompany drawings in the embodiments of the present disclosure. Apparently, the described embodiments are part or not all of the embodiments of the present disclosure. All other embodiments obtained by those skilled in the art based on the described embodiments of the present disclosure without contributing creative labor should fall within the protection scope of the present disclosure.

According to the method for converting 2D image into 3D image, binocular parallax images, i.e., a left-eye image and a right-eye image, are created to realize stereoscopic vision by performing perspective transformation on the 2D image; the distance between the left-eye image and the right-eye image is adjusted to create a convergence angle; and a 3D image may be formed by utilizing the binocular parallax images in combination with the convergence angle.

Figure 1:
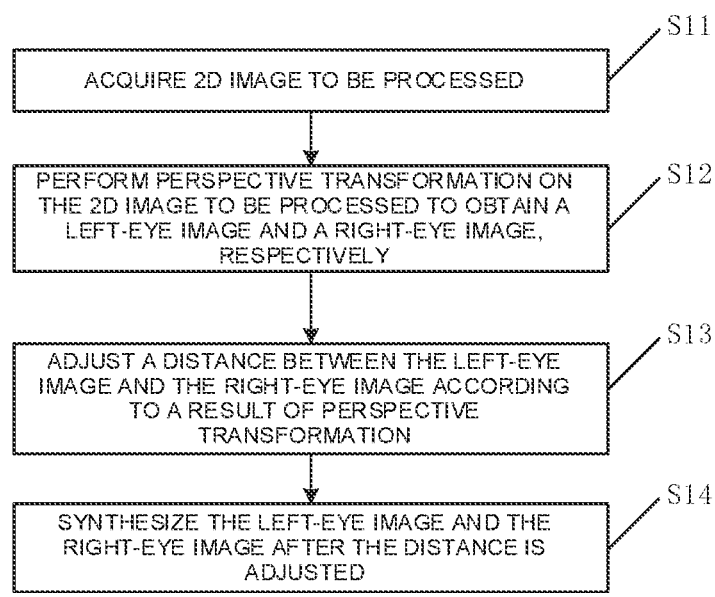
FIG. 1 shows a specific schematic flow chart for a method for converting 2D image into 3D image in an embodiment of the present disclosure.

An embodiment of the present disclosure provides a method for converting 2D image into 3D image, as shown in FIG. 1, comprising the following steps:

S11, acquiring 2D image to be processed;

The 2D image to be processed acquired by a device for converting 2D image into 3D image may be a 2D picture, may also be a frame image in a video stream, and may also be obtained by acquiring videos in real time and extracting each frame of images from the videos, as long as it may be ensured that the device for converting 2D image into 3D image may acquire the 2D image to be processed.

S12, performing a perspective transformation on the 2D image to be processed to obtain a left-eye image and a right-eye image, respectively.

The perspective transformation refers to mapping the 2D image to be processed according to a preset rule. The device for converting 2D image into 3D image maps the 2D image to be processed according to the preset rule, that is, the left-eye image and the right-eye image are formed through image processing according to perspective transformation on the basis of the 2D image to be processed. The preset rule is used for representing a manner of perspective transformation, e.g., a transformed image has a near end looking large and a far end looking small, or, a perspective image is calculated by a formula.

S13, adjusting a distance between the left-eye image and the right-eye image according to a result of perspective transformation;

The device for converting 2D image into 3D image adjusts the distance between the left-eye image and the right-eye image formed after perspective transformation, for creating a convergence angle.

Figure 2:
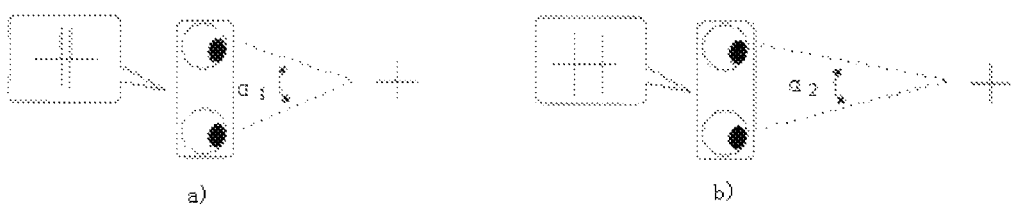
FIG. 2 shows a schematic diagram illustrating a relationship between a convergence angle and a distance between a left-eye image and a right-eye image in the embodiment of the present disclosure.

Through many experiments, the inventor found that the corresponding convergence angle is changed as the distance between the images is changed. For example, as shown in FIG. 2, the relationship between the convergence angle and the distance between the left-eye image and the right-eye image is described. As shown in FIG. 2*a*), when the convergence angle is $\alpha 1$, the distance between the left eye and the right eye is relatively small; and as shown in FIG. 2*b*), when the convergence angle is $\alpha 2$, the distance between the left eye and the right eye is relatively large. In other words, with the change of the distance between the left eye and the right eye, the convergence angle will change accordingly. Therefore, the convergence angle is created by adjusting the distance between the left eye and the right eye in the present disclosure.

S14, synthesizing the left-eye image and the right-eye image after the distance adjustment;

The device for converting 2D image into 3D image synthesizes the left-eye image and right-eye image after adjustment, that is, by use of the binocular parallax created through image transformation and the convergence angle, the left-eye image and the right-eye image after the distance adjustment are synthesized and then outputted to an image display means for subsequent 3D image display. The subsequent image display means may adjust polarization directions of the left-eye image and the right-eye image to make the polarization directions of the two images perpendicular to each other, so that the user may view a 3D image by wearing 3D glasses when being in use. The other ways may also be used for adjusting the polarization directions, as long as the polarization directions of the two images, which are viewed through both eyes of a person, respectively, are perpendicular to each other.

According to the embodiment of the present disclosure, binocular parallax images are created to realize stereoscopic vision by performing perspective transformation on the 2D image to be processed. Furthermore, the distance between the left-eye image and the right-eye image after perspective transformation is adjusted to form binocular parallax and create the convergence angle, so that the images observed by naked eyes are located at different depths, thus different stereoscopic effects may be seen. In other words, the image transformation is performed on the 2D image without involving the resolution and definition of the image, so that the image quality of the 3D imaged image is the same as that of the original 2D image and the 3D imaging effect is not affected.

Figure 3:
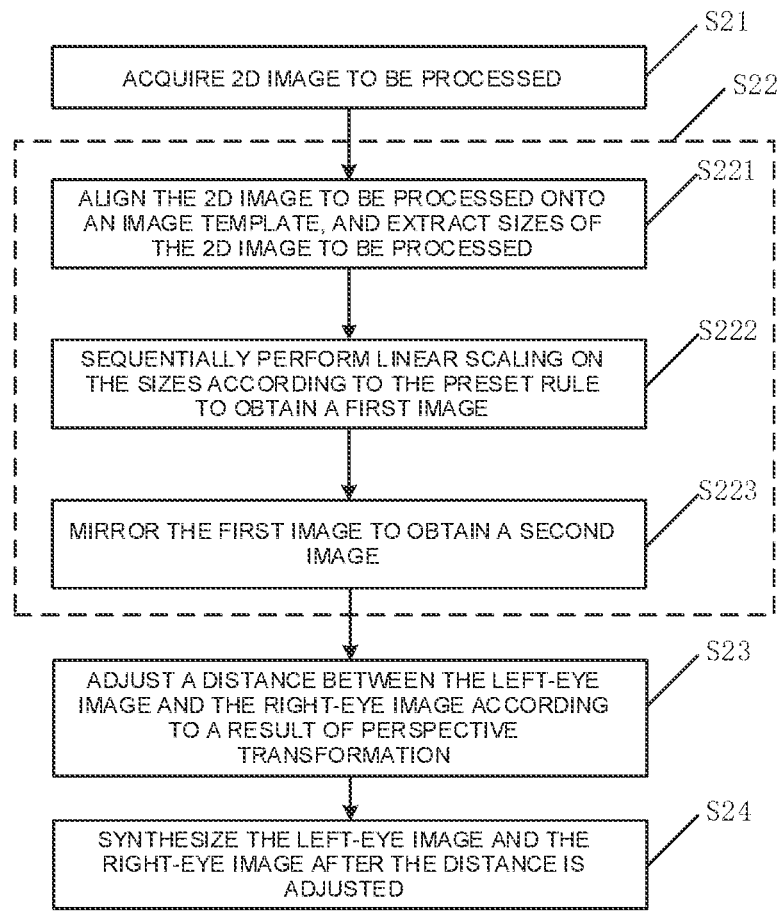
FIG. 3 shows another specific schematic flow chart for the method for converting 2D image into 3D image in the embodiment of the present disclosure.

An embodiment of the present disclosure also provides a method for converting 2D image into 3D image, as shown in FIG. 3, wherein the method comprises the following steps:

S21, acquiring 2D image to be processed;

The 2D image to be processed in the present embodiment is a frame image in a video stream, wherein a device for converting 2D image into 3D image sequentially extracts each frame of images, as the 2D image to be processed, from the video stream. Therefore, the method provided in the present embodiment may convert the video stream acquired by the device into a 3D video in real time.

S22, performing perspective transformation on the 2D image to be processed to obtain a left-eye image and a right-eye image, respectively;

The perspective transformation refers to mapping the 2D image to be processed according to a preset rule. The device for converting 2D image into 3D image in the present embodiment is provided with an image template for normalizing the 2D image to be processed.

Specifically, the step S22 comprises the following steps:

S221, aligning the 2D image to be processed onto the image template, and extracting sizes of the 2D image to be processed;

after acquiring the 2D image to be processed, the device for converting 2D image into 3D image aligns the 2D image to be processed onto the image template, and performs uniform scaling on the 2D image to be processed to ensure that the 2D image to be processed do not exceed a scope of the image template.

after aligning the 2D image to be processed onto the image template, the sizes of the 2D image to be processed are extracted, for representing the sizes of the respective sides of the 2D image to be processed.

Figure 4:
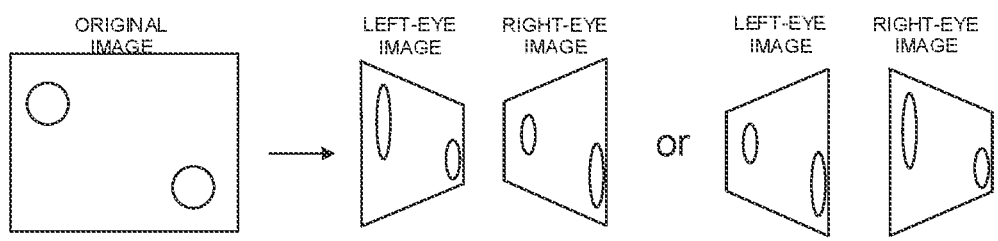
FIG. 4 shows a schematic diagram illustrating a principle of linear scaling in an embodiment of the present disclosure.

S222, performing linear scaling on the sizes in sequence according to the preset rule to obtain a first image;

The principle of linear scaling is shown as in FIG. 4. The perspective transformation comprises: by a left side of an original image as a rotating axis, turning, inwards a screen, the original image at a certain angle, and turning, outwards the screen, the original image at the same angle, so as to form a middle image and a rightmost image in FIG. 4, respectively. In the present embodiment, the 2D image to be processed is performed linear scaling in sizes so that the scaled left-eye image and right-eye image reach an effect as shown in FIG. 4, which specifically comprises the following steps:

1) scanning the 2D image to be processed line by line;

The device for converting 2D image into 3D image scans the 2D image to be processed aligned onto the image template line by line to obtain the sizes of the respective lines of the 2D image to be processed.

2) sequentially performing linear scaling on the respective lines of image;

The device for converting 2D image into 3D image performs linear scaling on the sizes of the respective lines of the 2D image to be processed according to a principle that one end looks large and the other end looks small, so as to obtain a scaled first image. The amount of processed data are reduced by performing sequentially the linear scaling on the respective lines, so that the real-time conversion of the 2D image may be realized.

S223, mirroring the first image to obtain a second image.

The device for converting 2D image into 3D image mirrors the first image to obtain the second image, that is, the first image is mirrored in a vertical direction to obtain the second image.

The first image is the left-eye image and the second image is the right-eye image; or, the first image is the right-eye image and the second image is the left-eye image.

S23, adjusting the distance between the left-eye image and the right-eye image according to a result of perspective transformation;

The device for converting 2D image into 3D image adjusts the distance between the left-eye image and the right-eye image after forming the left-eye image and the right-eye image and superposing the left-eye image and the right-eye image, so as to cause double visions of the two images.

S24, synthesizing the left-eye image and the right-eye image after the distance adjustment;

The device for converting 2D image into 3D image re-superposes the double visions of the left-eye image and the right-eye image after the distance adjustment, for displaying the 3D image on the image display means.

In the present embodiment, compared with the method for converting 2D image into 3D image in the embodiment shown in FIG. 1, the 2D image is converted into two images corresponding to the left eye and the right eye through linear scaling the 2D image, that is, the 2D image without parallax is converted into the left-eye image and the right-eye image with parallax, wherein the conversion process only involves the image sizes and is irrelevant to the image quality, so the left-eye image and the right-eye image formed by linear scaling have the same quality as the original 2D image. The left-eye image and the right-eye image may be formed through the conversion method provided by the present embodiment of the present disclosure while ensuring unchanged image quality.

Figure 5:
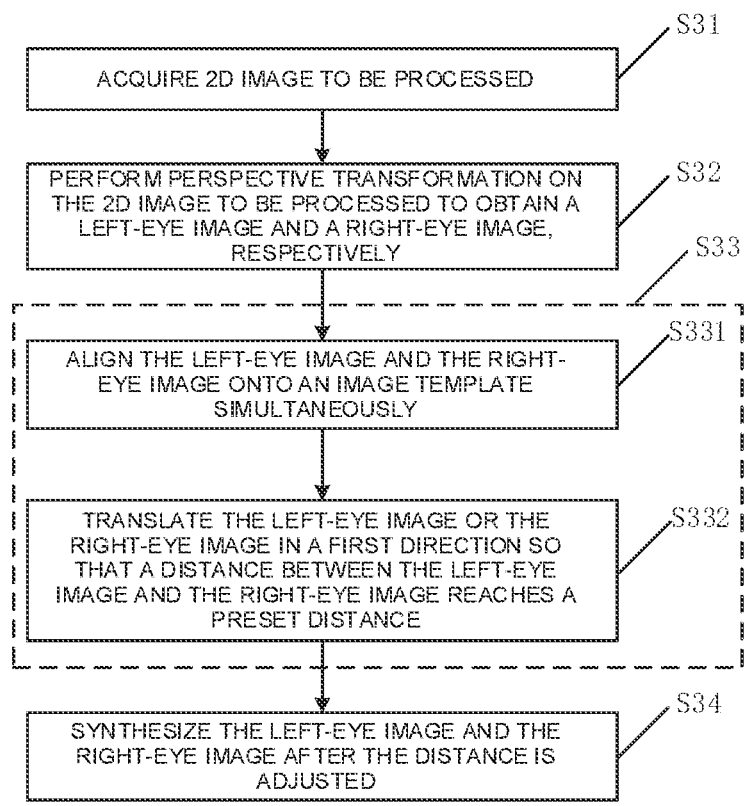
FIG. 5 shows another specific schematic flow chart for the method for converting 2D image into 3D image in the embodiment of the present disclosure.

A further method for converting 2D image into 3D image is also provided according to an embodiment of the present disclosure. As shown in FIG. 5, the method comprises the following steps:

S31, acquiring 2D image to be processed, which is the same as S21 in the embodiment shown in FIG. 3 and thus will not be repeated here.

S32, performing perspective transformation on the 2D image to be processed to obtain a left-eye image and a right-eye image, respectively, which is the same as S22 in the embodiment shown in FIG. 3 and thus will not be repeated here.

S33, adjusting a distance between the left-eye image and the right-eye image according to a result of perspective transformation.

In the present embodiment, the distance between the left-eye image and the right-eye image is adjusted by using an image template for normalizing the 2D image to be processed, which specifically comprises the following steps:

S331, aligning the left-eye image and the right-eye image onto the image template simultaneously;

The device for converting 2D image into 3D image simultaneously aligns the left-eye image and the right-eye image onto the image template, i.e., the left-eye image and the right-eye image are translated based on the image template, which may ensure better translation effect and improve the conversion efficiency of the 2D image without increasing the amount of processed data.

S332, translating the left-eye image or the right-eye image in the first direction so that the distance between the left-eye image and the right-eye image reaches a preset distance.

In the present embodiment, the first direction is a horizontal direction, and one of the left-eye image and the right-eye image aligned onto the image template is translated in the horizontal direction or both of the left-eye image and the right-eye image are simultaneously moved in opposite directions, so that the distance between the left-eye image and the right-eye image reaches a preset distance, wherein the preset distance may be specifically set according to a size of the actual display means.

S34, synthesizing the left-eye image and the right-eye image after the distance adjustment, which is the same as S24 in the embodiment shown in FIG. 3 and thus will not be repeated here.

In the present embodiment, compared with the method for converting 2D image into 3D image in the embodiment as shown in FIG. 3, the left-eye image and the right-eye image are formed by using the same image template; and the left-eye image and the right-eye image are translated to create the binocular parallax and the convergence angle, thereby improving the conversion efficiency.

Figure 6:
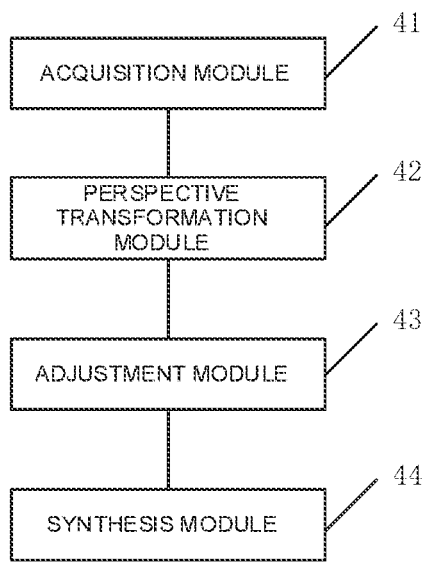
FIG. 6 shows a specific schematic structural diagram of a device for converting 2D image into 3D image in an embodiment of the present disclosure.

An embodiment of the present disclosure also provides a device for converting 2D image into 3D image. As shown in FIG. 6, the device comprises:

an acquisition module 41 for acquiring 2D image to be processed;

a perspective transformation module 42 for performing perspective transformation on the 2D image to be processed to obtain a left-eye image and a right-eye image, respectively, wherein the perspective transformation refers to mapping the 2D image to be processed according to a preset rule;

an adjustment module 43 for adjusting a distance between the left-eye image and the right-eye image according to a result of perspective transformation; and a synthesis module 44 for synthesizing the left-eye image and the right-eye age after the distance adjustment.

According to the device for converting 2D image into 3D image provided by the embodiment of the present disclosure, binocular parallax images are created to realize stereoscopic vision by performing perspective transformation on the 2D image to be processed; the distance between the left-eye image and the right-eye image after perspective transformation is adjusted to form binocular parallax and create a convergence angle, so that the images observed by naked eyes are located at different depths, thus different stereoscopic effects may be seen. In other words, the image transformation is performed on the 2D image without involving the resolution and definition of the image, so that the image quality of the 3D imaged image is the same as that of the original 2D image and the 3D imaging effect is not affected.

Figure 7:
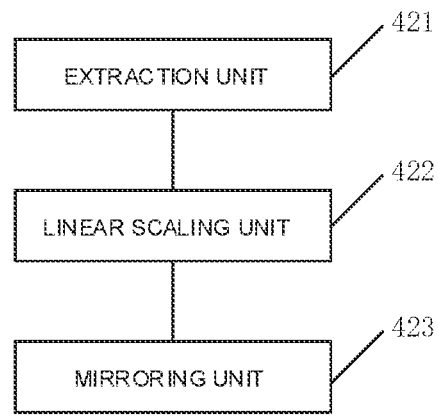
FIG. 7 shows another specific schematic structural diagram of a device for converting 2D image into 3D image in an embodiment of the present disclosure.

In some optional implementation modes of the present embodiment, as shown in FIG. 7, the perspective transformation module 42 comprises:

an extraction unit 421 for aligning the 2D image to be processed onto the image template and extracting the sizes of the 2D image to be processed;

a linear scaling unit 422 for sequentially performing linear scaling on the sizes according to a preset rule to obtain a first image; and a mirroring unit 423 for mirroring the first image to obtain a second image, wherein the first image is the left-eye image and the second image is the right-eye image; or, the first image is the right-eye image and the second image is the left-eye image.

Figure 8:
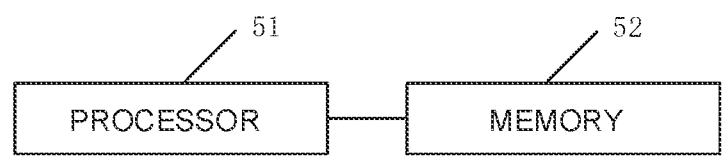
FIG. 8 shows a specific schematic structural diagram of an image processing means in an embodiment of the present disclosure.

An embodiment of the present disclosure also provides image processing means. As shown in FIG. 8, the image processing means may comprise a processor 51 and a memory 52, wherein the processor 51 and the memory 52 may be connected through a bus or other ways, e.g., through the bus in FIG. 8.

The processor 51 may be a Central Processing Unit (CPU). The processor 51 may also be other general-purpose processors, Digital Signal Processor (DSPs), application specific integrated circuits (ASICs), Field-Programmable Gate Arrays (FPGAs) or other programmable logic devices, discrete gate or transistor logic devices, discrete hardware components and other chips, or a combination of the above chips.

As a non-transient computer-readable storage medium, the memory 52 may be used for storing non-transient software programs, non-transient computer-executable programs and modules, such as program instructions/modules (such as the acquisition module 41, the perspective transformation module 42, the adjustment module 43 and the synthesis module 44 shown in FIG. 6) corresponding to the method for converting 2D image into 3D image in the embodiment of the present disclosure. The processor 51 executes various functional applications and data processing of the processor by running non-transient software programs, instructions and modules stored in the memory 52, that is, the method for converting 2D image into 3D image in the above embodiment of method is implemented.

The memory 52 may comprise a program memory area and a data memory area, wherein the program memory area may store application programs required for operating the system and at least one function; and the data memory area may store data created by the processor 51. In addition, the memory 52 may include a high-speed random access memory, and may also include a non-transient memory, such as at least one disk memory device, a flash memory device or other non-transient solid-state memory devices. In some embodiments, the memory 52 may optionally include memories remotely arranged relative to the processor 51; and these remote memories may be connected to the processor 51 through a network. Examples of the above network include, but are not limited to, the Internet, intranet, local area network, mobile communication network and combinations thereof.

The one or more of the modules are stored in the memory 52; and when implementing by the processor 51, the method for converting 2D image into 3D image in the embodiments as shown in FIG. 1, FIG. 3 and FIG. 5 is implemented.

The specific details of the above image processing means may be understood by referring to the corresponding descriptions and effects in the embodiments shown in FIG. 1, FIG. 3 and FIG. 5, and will not be repeated here.

Figure 9:
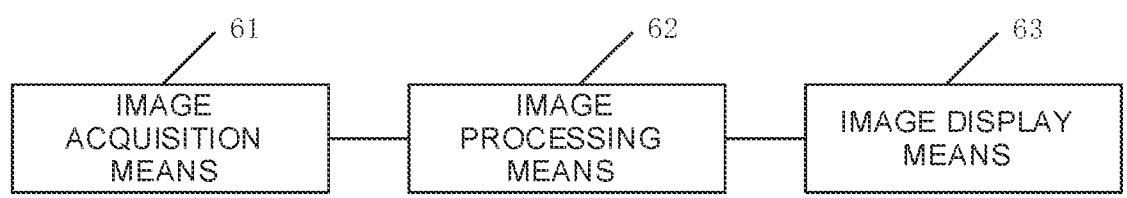
FIG. 9 shows a specific schematic structural diagram of a 3D imaging system in an embodiment of the present disclosure.

An embodiment of the present disclosure also provides a 3D imaging system; and as shown in FIG. 9, the system comprises an image acquisition means 61, an image processing means 62 and an image display means 63.

In the image acquisition means 61, the lens for acquiring images comprises a single lens. The image processing means 62 is electrically connected to the image acquisition means 61, for converting the 2D image to be processed outputted by the image acquisition means 61 into the 3D image. The image display means 63 is electrically connected to the image processing device 62, for displaying the 3D image outputted by the image processing means 62.

In the 3D imaging system provided by the embodiment of the present disclosure, the lens of the image acquisition means 61 comprises a single lens, which reduces the volume of the whole image acquisition means 61. In addition, the image acquisition means with a single lens needs only one data line to transmit the acquired image, which may reduce the inner diameter of a connection line between the image acquisition means 61 and the image processing means 62, so that the 3D imaging system may be applied to the interior of smaller objects, such as human organs, to perform 3D imaging on the human organs, thereby further improving the application scope of the 3D imaging system.

Those skilled in the prior art should understand that all or part of the processes in the methods of the above embodiments may be completed by instructing related hardware through a computer program; the program may be stored in a computer-readable storage medium, and may comprise the processes of the embodiments of the above methods when the program is executed, wherein the storage medium may be a magnetic disk, optical disk, Read-Only Memory (ROM), Random Access Memory (RAM), Flash Memory, Hard Disk Drive (HDD) or Solid-State Drive (SSD); and the storage medium may also comprise a combination of the above types of memories.

The embodiments of the present disclosure are described with reference to the accompanying drawings, but various modifications and variations may be made by those skilled in the art without departing from the spirits and the scope of the present disclosure, and such modifications and variations should fall within the scope defined by the appended claims.

What is claimed is:

1. A method for converting a 2D image into a 3D image, comprising the following steps of:

acquiring the 2D image to be processed;

performing perspective transformation on the 2D image to be processed to obtain a left-eye image and a right-eye image, respectively, wherein the perspective transformation refers to mapping the 2D image to be processed according to a preset rule, and the step of performing perspective transformation on the 2D image to be processed comprises:

aligning the 2D image to be processed onto an image template, and extracting sizes of the 2D image to be processed;

sequentially performing linear scaling on the sizes of respective sides according to the preset rule to obtain a first image; and mirroring the first image to obtain a second image, wherein the first image is as the left-eye image and the second image is as the right-eye image; or, the first image is as the right-eye image and the second image is as the left-eye image;

adjusting a distance between the left-eye image and the right-eye image according to a result of the perspective transformation; and synthesizing the left-eye image and the right-eye image after the distance is the adjusted.

2. The method according to claim 1, wherein the step of sequentially performing linear scaling on the sizes of respective sides according to the preset rule comprises:

scanning the 2D image to be processed line by line; and sequentially performing the linear scaling on respective lines of the image.

3. The method according to claim 1, wherein the step of adjusting the distance between the left-eye image and the right-eye image according to the result of the perspective transformation comprises:

aligning the left-eye image and the right-eye image onto the image template at the same time; and translating the left-eye image or the right-eye image in a first direction so that the distance between the left-eye image and the right-eye image reaches a preset distance.

4. The method according to claim 1, wherein the 2D image to be processed is a frame image in a video stream.

5. A device for converting a 2D image into a 3D image, comprising:

an acquisition module for acquiring the 2D image to be processed;

a perspective transformation module for performing perspective transformation on the 2D image to be processed to obtain a left-eye image and a right-eye image, respectively, wherein the perspective transformation refers to mapping the 2D image to be processed according to a preset rule, and the perspective transformation module comprises:

an extraction unit for aligning the 2D image to be processed onto an image template and extracting sizes of the 2D image to be processed;

a linear scaling unit for sequentially performing linear scaling on the sizes of respective sides according to the preset rule to obtain a first image; and a mirroring unit for mirroring the first image to obtain a second image, wherein the first image is as the left-eye image and the second image is as the right-eye image; or, the first image is as the right-eye image and the second image is as the left-eye image;

an adjustment module for adjusting a distance between the left-eye image and the right-eye image according to a result of the perspective transformation; and a synthesis module for synthesizing the left-eye image and the right-eye image after the distance is adjusted.

6. An image processing means, comprising:

a memory and a processor, which are in communication connection with each other, wherein computer instructions are stored in the memory, and the processor is suitable for implementing the method for converting 2D images into 3D images of claim 1 by executing the computer instructions.

7. A non-transitory computer-readable storage medium, wherein the computer-readable storage medium stores computer instructions for enabling a computer to implement the method for converting 2D image into 3D image of claim 1.

8. A 3D imaging system, comprising:

image acquisition means, having a single lens as a lens for image acquisition;

the image processing means of claim 6, which is electrically connected to the image acquisition means, for converting the 2D image into the 3D image; and image display means, which is electrically connected to the image processing means for displaying the 3D image.

* * * * *